United States Patent
Elliott

(10) Patent No.: US 6,745,556 B2
(45) Date of Patent: Jun. 8, 2004

(54) FUEL SYSTEM

(75) Inventor: Philip Laurence Elliott, Birmingham (GB)

(73) Assignee: Lucas Industries Limited (GB)

( * ) Notice: Subject to any disclaimer, the term of this patent is extended or adjusted under 35 U.S.C. 154(b) by 11 days.

(21) Appl. No.: 10/205,327

(22) Filed: Jul. 25, 2002

(65) Prior Publication Data

US 2003/0019203 A1 Jan. 30, 2003

(30) Foreign Application Priority Data

Jul. 26, 2001 (GB) .............................................. 0118214

(51) Int. Cl.[7] ................................................. F02C 9/28
(52) U.S. Cl. ...................................... 60/39.281; 60/734
(58) Field of Search ............................... 60/39.281, 734

(56) References Cited

U.S. PATENT DOCUMENTS 3,732,039 A * 5/1973 Carothers .................... 417/300
4,422,289 A * 12/1983 Langton .................. 60/39.281
5,579,632 A * 12/1996 Dutka et al. ............. 60/39.281

* cited by examiner

Primary Examiner—Louis J. Casaregola
(74) Attorney, Agent, or Firm—Brown Raysman Millstein Felder & Steiner LLP

(57) ABSTRACT

The present invention relates to a fuel control system for use in conjunction with a gas turbine engine.

4 Claims, 1 Drawing Sheet

FUEL SYSTEM

BACKGROUND OF THE INVENTION

This invention relates to a fuel control system for use in conjunction with a gas turbine engine, primarily a gas turbine engine constituting one of the engines of a twin or other multi-engine aircraft.

Considering a twin engine aircraft as the simplest example of a multi-engine aircraft, then in the event that an engine's control system malfunctions in a way which results in over-speed of that engine then that engine produces excessive thrust by comparison with the thrust required in that operating condition and the aircraft can yaw. Such a situation arising during most of the flight cycle is unfortunate, but can normally be accommodated by shutting down the engine experiencing the excessive thrust. However, if one of the engines suffers an uncommanded increase in thrust during the pre-landing approach phase of the flight cycle then the yaw generated can prove more problematic.

SUMMARY OF THE INVENTION

If, as may well be the case, the yaw cannot be compensated for by the pilot by rudder control then the only option is to reduce the fuel supply to the engine which is experiencing the uncommanded increase in thrust and a rapid reduction in engine fuelling may well cause the engine to "flameout" and thus to stop operating suddenly in a part of the flight cycle where there is no time to restart the engine. A sudden flameout of one engine will result in a thrust imbalance and probably a severe resultant yaw in the opposite direction. Such problems have been recognised in the past, and our co-pending patent application GB 2300451 discloses one way in which the flow of fuel to each engine can be controlled to avoid such difficulties. While the arrangement disclosed in our co-pending British patent application GB 2300451 admirably overcomes such operating difficulties, it does so by requiring a significant duplication of components in the engine fuel control system which adds to the weight, cost and complexity of the fuel system and the servicing requirements of the fuel system. It is an object of the present invention to provide a fuel control system for a gas turbine engine wherein the aforementioned disadvantages are mitigated in a simple and convenient manner.

In accordance with the present invention there is provided a fuel control system for a gas turbine engine comprising, a main fuel metering valve for controlling the flow of fuel to a respective gas turbine engine in use, the valve including a valve control member moveable relative to a valve body by fluid pressure applied to a pressure chamber of the valve, to control the quantity of fuel supplied through the valve between zero in a valve closed condition and a maximum in a valve fully-open condition, a first fluid control valve operable to control the application of fluid pressure to said pressure chamber of said metering valve to determine the setting of said metering valve and thus the quantity of fuel supplied to the gas turbine engine through the metering valve, means for detecting an over-speed operating condition of the respective gas turbine engine in use, and, a second fluid control valve moveable from a first condition to a second condition in response to detection of such over-speed condition, said second fluid control valve serving in said first condition to apply fluid pressure derived from said first fluid control valve to said pressure chamber of said metering valve, and serving in its said second condition to prevent the application of fluid pressure derived from said first fluid control valve to said pressure chamber of said metering valve and to vent said pressure chamber to permit said control member of said metering valve to move towards a valve closed position.

Preferably the passage through which fluid pressure in said pressure chamber of said metering valve is vented in said second condition of said second fluid control valve, includes a restrictor determining the rate at which said control member of said metering valve moves towards said metering valve closed condition.

Preferably said metering valve includes inlet port means connected to the supply of fluid pressure from the first fluid control valve other than through said second fluid control valve, and an internal connection between said inlet port means and said pressure chamber which opens, to supply fluid pressure from said first fluid control valve to said pressure chamber, in a position of said metering valve control member relative to the valve body in which there is a predetermined quantity of fuel supplied through the metering valve to said engine in use.

DETAILED DESCRIPTION OF THE PREFERRED EMBODIMENT

Figure 1:
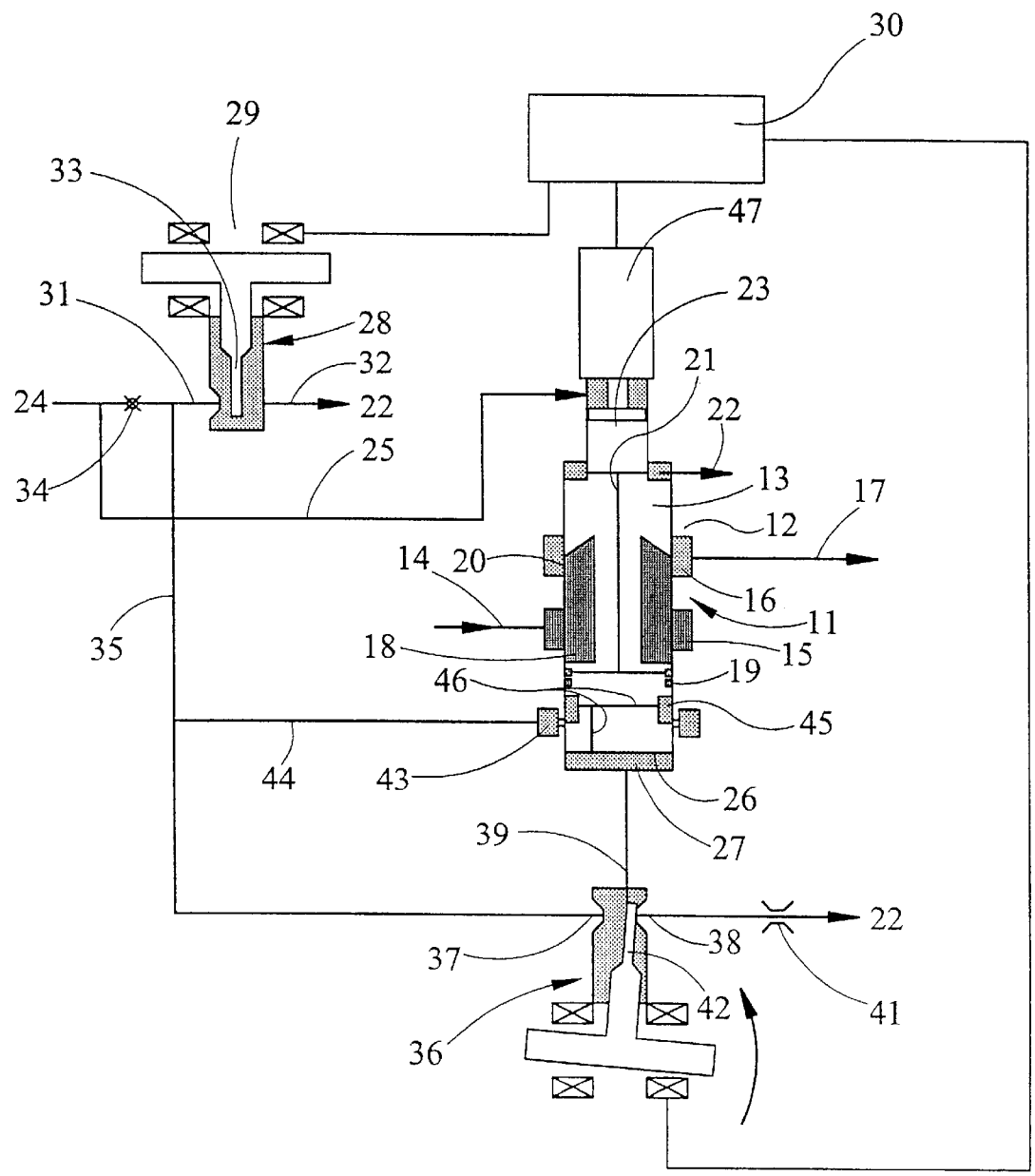
FIG. 1 is a diagrammatic representation of a fuel control system in accordance with one embodiment of the invention.

One example of the invention will now be described with reference to the accompanying drawing which is a diagrammatic representation of a fuel control system for a gas turbine engine.

Referring to the drawing, it can be seen that the gas turbine engine fuel control system includes a fuel metering valve 11 comprising an outer, generally stationary body 12 slidably receiving a valve control member 13. A high pressure fuel supply line 14 communicates with an inlet gallery 15 in the body 12 around the control member 13, and a second similar, outlet gallery 16 in the body 12 is connected to a high pressure fuel output line 17 leading to the burner assembly of the associated gas turbine engine. An annular chamber 18 of the valve control member 13 overlies, and communicates with the inlet gallery 15 throughout the range of axial movement of the member 13 in the body 12, and one axial end of the chamber 18 co-acts with the outlet gallery 16 to define a variable orifice 20 controlling the quantity of fuel which can flow from the line 14 through the gallery 15, the chamber 18, the gallery 16 and the line 17 to the engine. The size of the orifice 20, and therefore the quantity of fuel which flows to the engine, is determined by the axial position of the control member 13 in the body 12. Sliding seals 19 seal the interface of the member 13 and the body 12 and a drain passage 21 within the member 13 allows any fuel leaking past the seals to flow to a low pressure drain 22 which conveniently returns fuel through a filter to a fuel reservoir.

The axial position of the control member 13 within the body 12 is determined by hydraulic pressure acting on the opposite axial ends of the member 13. At one axial end the member 13 defines a relatively small area piston 23 exposed to fluid pressure from a pressure regulated source 24 by way of a line 25. The opposite axial end of the member 13 defines a larger area piston 26 exposed to fluid pressure in a fluid pressure chamber 27.

The system further includes a first fluid pressure control valve 28 operated by a torque motor 29 in known manner. The valve 28 includes an inlet 31 and an outlet 32 and a closure member 33 of the valve, moveable by the torque motor 29, controls the flow of fluid under pressure through the valve 28 between the inlet 31 and the outlet 32. The fluid supplied from the source 24 is conveniently fuel. The outlet 32 of the valve 29 is connected to a low pressure drain, and where the fluid is fuel then the low pressure drain is connected to the drain 22. The fluid pressure source 24 is connected to the inlet 31 of the valve 28 through a restrictor 34 and a line 35 connected between the inlet 31 and the restrictor 34 is connected to an inlet 37 of a second torque motor controlled valve 36.

The valve 36 is a change-over valve and has an inlet port 37, an outlet port 38, and a third port 39 communicating with the chamber 27 of the valve 11. The outlet port 38 of the valve 36 is connected to the low pressure drain 22 by way of a restrictor 41. The control member 42 of the valve 36, which is moved by the torque motor of the valve, can occupy a first position as shown in the drawing in which the outlet 38 is closed and the inlet 37 communicates with the port 39 so that fluid under pressure from the line 35 flows to the chamber 27, and a second, opposite position in which the control member 42 closes the inlet 37 and places the port 39 in communication with the outlet port 38 so that the chamber 27 can be vented through the restrictor 41 to the low pressure drain.

The body 12 of the valve 11 is provided with a further annular gallery 43 permanently connected by way of a line 44 to the line 35. Thus the gallery 43 is permanently exposed to the fluid pressure existing between the restrictor 34 and the inlet 31 of the valve 28. Adjacent the piston face 26 an annular recess 45 is formed in the cylindrical wall of the control member 13 of the valve 11. The recess 45 is connected by way of internal passages 46 of the control member 13 to the chamber 27 but the positioning of the recess 45 axially of the valve 11 is such that there is no communication between the recess 45 and the gallery 43 until the control member 13 is in an axial position at which there is a predetermined flow through the valve between the high pressure supply 14 and the line 17.

A sensor in the form of a Linear Variable Differential Transformer (LVDT) 47 continually monitors the position of the control member 13 within the valve body 12 and supplies a signal representative of the position of the control member 13 to the electronic control circuit of the fuel system.

The operation of the fuel control system is as follows. During normal operation of the system the valve 36 is in the operating condition shown in the drawing in which the control member 42 closes the outlet port 38 and establishes connection between the inlet port 37 and the third port 39. Thus fluid pressure from the source 24, which in use can be considered to be a constant pressure, is applied to the small area piston 23 of the control member 13 of the valve 11 and the fluid pressure existing between the restrictor 34 and the valve inlet 31, which can vary with the setting of the valve 28, is supplied to the chamber 27 and so acts on the opposite, larger area piston 26 of the control member 13. When the force acting on the piston 23 exceeds that acting on the piston 26 the member 13 is driven towards its valve closed position and when the force on piston 26 exceeds that on piston 23 the member is driven towards its valve fully-open position.

The pressure existing between the inlet 31 of the valve 28 and the restrictor 34 is controlled by the degree of opening of the valve 28, which in turn is controlled by operation of the torque motor 29. The electronic control circuit 30 of the fuel system supplies signals to the torque motor 29 to control the opening of the valve 28 in accordance with the required operating speed of the engine and the position of the control member 13 of the valve 11 as measured by the LVDT 47 and by varying the position of the control member 33 of the valve 28 the pressure in the line 35 can be varied, and thus the axial position of the control member 13 can be altered with consequential alteration in the quantity of fuel supplied from the line 14 through the control valve 11 to the line 17 and the burners of the gas turbine engine. The LVDT 47 in effect provides a closed loop control over the opening of the valve 11 in that the circuit 30 can compare the actual position of the member 13 with a stored or calculated position corresponding to a desired fuel flow.

During normal operation the condition of the valve 36 does not change.

The electronic control circuit 30 of the engine fuel control system continually monitors the operating speed of the engine and controls the fuel supply to the engine by moving the control member 33 of the valve 28, to maintain the engine speed in accordance with the speed commanded control system of the aircraft. The electronic control circuit 30 includes an over-speed detection arrangement which, in the event that the engine speed exceeds the commanded speed by a predetermined amount, causes operation of the torque motor of the valve 36 to change the condition of the valve 36 from the condition shown, to the second condition in which the control member 42 closes the inlet 37 and places the port 39 in communication with the outlet port 38.

An over-speed condition can arise, for example, as a result of failure of the valve 28. For example, the valve 28 may fail by closing to an extent greater than that commanded by the electronic control circuit thereby increasing the pressure in the line 35 and driving the control member 13 of the valve 11 to a more open position, so supplying more fuel to the engine than is required for the commanded operating speed of the engine. As mentioned above engine over-speed can cause the aircraft to yaw as a result of an imbalance in the thrust between engines on opposite sides of the aircraft. Changing the operating condition of the valve 36 disconnects the line 35 from the chamber 27, and thus isolates the valve 11 from any further fluctuations in the pressure in the line 35 which could arise from uncommanded operation of the valve 28. At the same time the connection of the chamber 27 through the port 39 and the outlet port 38 to the drain 22 allows the pressure in the chamber 27 to decay, and thus allows the valve member 13 to move towards its closed position reducing the amount of fuel supplied to the over-speed engine.

The presence of the restrictor 41 in the line between the outlet 38 and the low pressure drain controls the rate at which the pressure in the chamber 27 decays, and thus controls the rate at which the fuel supply to the engine diminishes. In the absence of the restrictor 41 it is possible that the fuel supply to the engine would be reduced so quickly that the engine could flame-out and clearly in the pre-landing approach phase of the aircraft flight cycle an engine flame-out on one side of the aircraft could have disastrous results. In order that the valve 11 does not close completely in response to an over-speed fault condition, and instead maintains a predetermined supply of fuel to the engine so that the engine continues to operate, conveniently at low speed, the recess 45 is arranged to communicate with the gallery 43, as described above, in advance of the control member 13 reaching a point at which it closes the orifice 20 cutting off the communication between the galleries 15 and 16. Thus as the member 13 approaches its closed position fluid pressure from the line 35 is applied by way of the line 44, the gallery 43, the recess 45 and the internal passages 46 to the pressure chamber 27. The pressure chamber 27 remains vented to the low pressure drain by way of the restrictor 41 and an equilibrium position is reached at which pressure is maintained in the chamber 27 to maintain the predetermined fuel flow to the engine. Should the pressure in the line 35 increase, by virtue for example of an uncommanded further closure of the valve 28 then the pressure in the chamber 27 will increase and the member 13 will tend to move towards its open position. However, immediately such movement takes place the communication between the gallery 43 and the recess 45 will be broken and thus pressure from the line 35 will no longer be supplied to the chamber 27. The chamber 27 pressure will thus decay by virtue of the connection through the restrictor 41 to the low pressure drain and the member 13 will return towards its closed position until the communication between the gallery 43 and the recess 45 is re-established. Thus irrespective of fluctuations in the operation of the valve 28 the predetermined fuel supply to the engine will be maintained so that the engine will continue to operate and will provide some thrust whereby the pilot, or autopilot of the aircraft can maintain control.

The valve 36 remains in its second condition once there has been an over-speed situation until reset by the pilot. Naturally if the control system of the aircraft detects a fault condition affecting operation of the valve 28 then any attempt by the pilot to reset the valve 36 will be overridden. The system described above therefore ensures that in an over-speed condition fuel to the over-speed engine is reduced in a controlled manner avoiding inadvertent flame-out, and is also maintained at a safe low level so that the engine can continue to operate, irrespective of fluctuations in the setting of the valve 28.

When it is desired to shut-down the engine the flow of fuel to the engine burners will be deliberately interrupted by either or both of, opening an upstream spill valve to spill fuel back to the supply, and, closing a downstream fuel shut-off valve.

I claim:

1. A fuel control system for a gas turbine engine comprising, a main fuel metering valve for controlling the flow of fuel to a respective gas turbine engine in use, the valve including a valve control member moveable relative to a valve body by fluid pressure applied to a pressure chamber of the valve, to control the quantity of fuel supplied through the valve between zero in a valve closed condition and a maximum in a valve fully-open condition, a first fluid control valve operable to control the application of fluid pressure to said pressure chamber of said metering valve to determine the setting of said metering valve and thus the quantity of fuel supplied to the gas turbine engine through the metering valve, means for detecting an over-speed operating condition of the respective gas turbine engine in use, and, a second fluid control valve moveable from a first condition to a second condition in response to detection of such over-speed condition, said second fluid control valve serving in said first condition to apply fluid pressure derived from said first fluid control valve to said pressure chamber of said metering valve, and serving in its said second condition to prevent the application of fluid pressure derived from said first fluid control valve to said pressure chamber of said metering valve and to vent said pressure chamber to permit said control member of said metering valve to move towards a valve closed position.

2. A fuel control system as claimed in claim 1 wherein a passage through which fluid pressure in said pressure chamber of said metering valve is vented in said second condition of said second fluid control valve, includes a restrictor determining the rate at which said control member of said metering valve moves towards said metering valve closed condition.

3. A fuel control system as claimed in claim 1 wherein said metering valve includes inlet port means connected to the supply of fluid pressure from the first fluid control valve other than through said second fluid control valve, and an internal connection between said inlet port means and said pressure chamber which opens, to supply fluid pressure from said first fluid control valve to said pressure chamber, in a position of said metering valve control member relative to the valve body in which there is a predetermined quantity of fuel supplied through the metering valve to said engine in use.

4. A fuel control system as claimed in claim 2 wherein said metering valve includes inlet port means connected to the supply of fluid pressure from the first fluid control valve other than through said second fluid control valve, and an internal connection between said inlet port means and said pressure chamber which opens, to supply fluid pressure from said first fluid control valve to said pressure chamber, in a position of said metering valve control member relative to the valve body in which there is a predetermined quantity of fuel supplied through the metering valve to said engine in use.

* * * * *